(12) United States Patent
Araya et al.

(10) Patent No.: US 7,342,219 B2
(45) Date of Patent: Mar. 11, 2008

(54) LASER SCANNING MICROSCOPE

(75) Inventors: Akinori Araya, Yokohama (JP); Makio Ueno, Kamiina-gun (JP)

(73) Assignee: Olympus Corporation, Tokyo (JP)

( * ) Notice: Subject to any disclaimer, the term of this patent is extended or adjusted under 35 U.S.C. 154(b) by 192 days.

(21) Appl. No.: 11/141,517

(22) Filed: May 31, 2005

(65) Prior Publication Data

US 2005/0263690 A1    Dec. 1, 2005

(30) Foreign Application Priority Data

Jun. 1, 2004    (JP)    ............... 2004-163360

(51) Int. Cl.
*H01J 3/14* (2006.01)
*G02B 21/06* (2006.01)

(52) U.S. Cl. ............... 250/234; 250/201.3; 250/458.1; 359/385

(58) Field of Classification Search ........ 250/234–236, 250/201.3, 458.1; 359/368, 385, 388
See application file for complete search history.

(56) References Cited

U.S. PATENT DOCUMENTS

2005/0046849 A1* 3/2005 Cromwell et al. .......... 356/417

FOREIGN PATENT DOCUMENTS

| JP | 10-512959 A | 12/1998 |
| JP | 2000-206415 A | 7/2000 |
| JP | 2003-322799 A | 11/2003 |

OTHER PUBLICATIONS

A. Goutzoulis et al; Design and Fabrication of Acousto-Optic Devices, Marcel Dekker, Inc. 1994; pp. 246-283.

* cited by examiner

*Primary Examiner*—Kevin Pyo
(74) *Attorney, Agent, or Firm*—Frishauf, Holtz, Goodman & Chick, P.C.

(57) ABSTRACT

A laser scanning microscope includes an acousto-optic element or an electro-optic element in an illumination optical system which introduces a laser beam from a laser beam source of the laser scanning microscope into a microscope. The laser scanning microscope further includes a beam expander disposed between the laser beam source and the acousto-optic element or the electro-optic element.

5 Claims, 11 Drawing Sheets

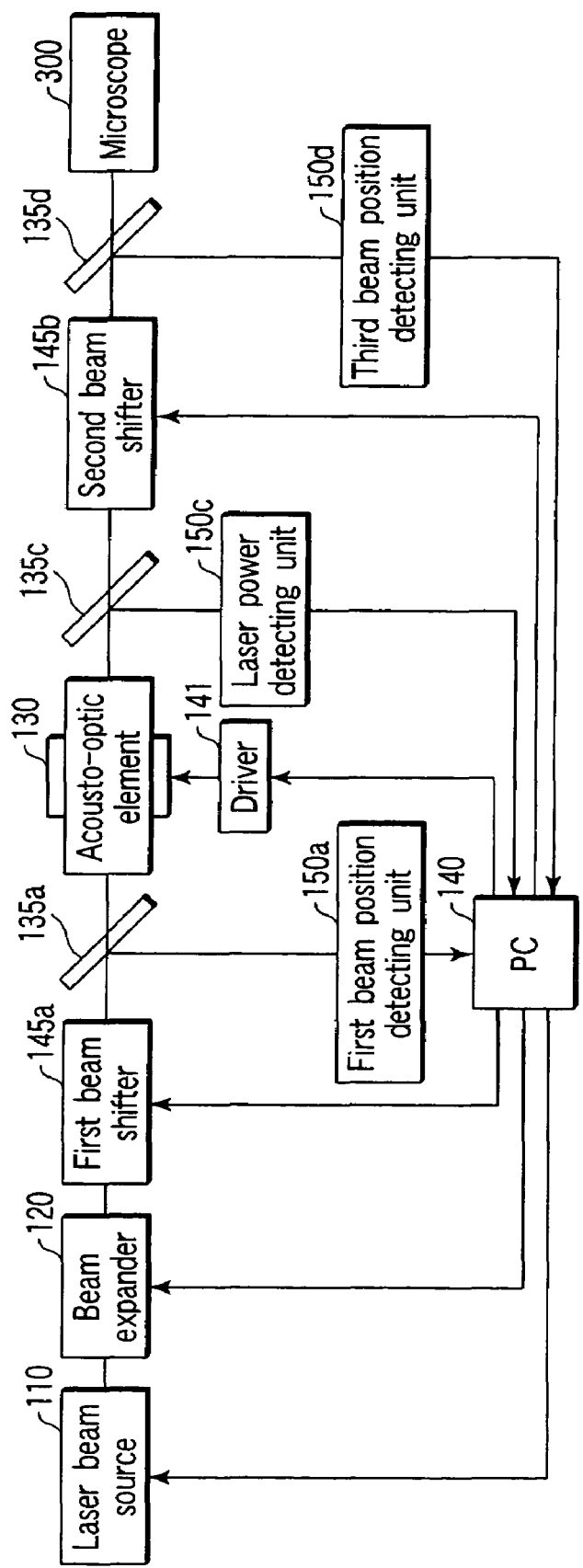
F I G. 17

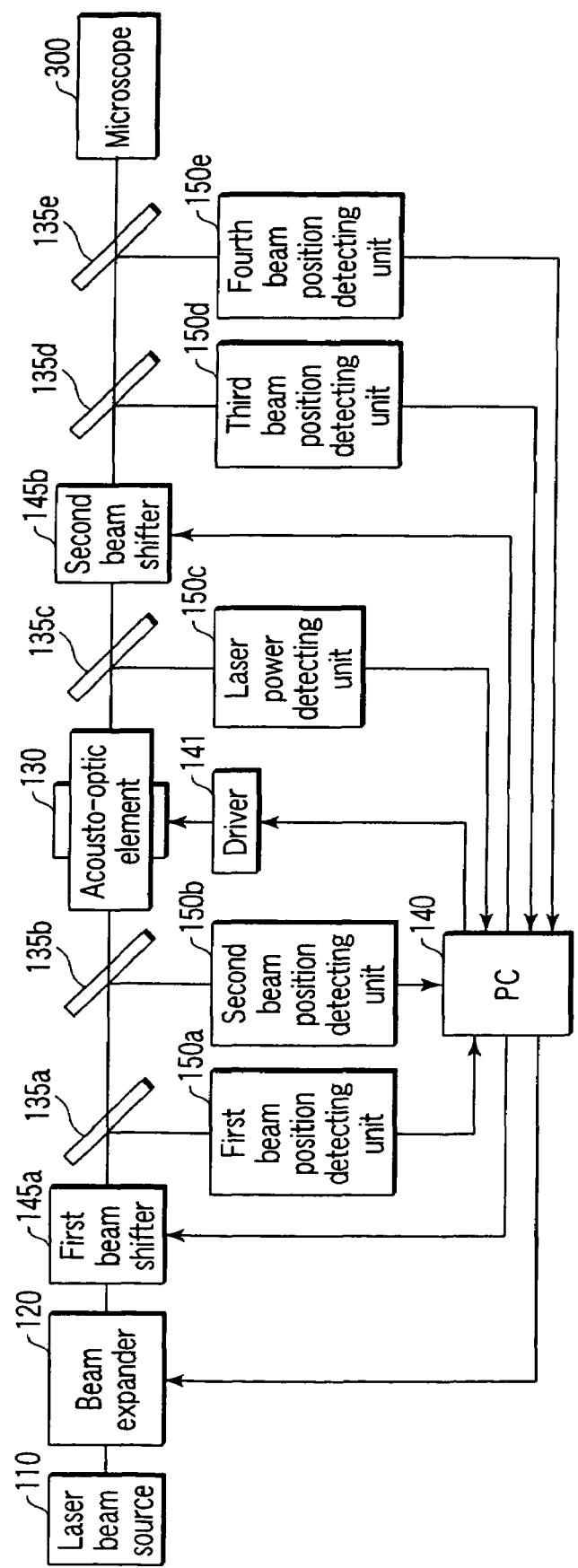
F I G. 25

LASER SCANNING MICROSCOPE

CROSS-REFERENCE TO RELATED APPLICATIONS

This application is based upon and claims the benefit of priority from prior Japanese Patent Application No. 2004-163360, filed Jun. 1, 2004, the entire contents of which are incorporated herein by reference.

BACKGROUND OF THE INVENTION

1. Field of the Invention

The present invention relates to a laser scanning microscope.

2. Description of the Related Art

The laser scanning microscope enables obtaining two-dimensional cross-sectional images by optically slicing, but not damaging, a sample such as living cell, tissue, or the like, and obtaining a three-dimensional image from a plurality of cross-sectional images.

The laser scanning microscope observing a biological sample irradiates fluorescent reagents or fluorescent protein introduced into the sample with a laser beam, and measures the fluorescence therefrom to be imaged. At that time, a plurality of fluorescent reagents or fluorescent proteins are introduced into the sample, and it is possible to observe a plurality of chemical substances in the cells. In order to excite these plurality of fluorescent materials, an excitation laser beam having a plurality of wavelengths is required. An example of a laser beam source for outputting an excitation laser beam having a plurality of wavelengths is shown in FIG. 1.

On the other hand, a fading phenomenon that an amount of fluorescence from the fluorescent materials decreases accompanying an irradiation time of an excitation light is brought about. Therefore, it is necessary to prevent fading as much as possible by cutting off an unnecessary excitation light from or reducing light to the laser scanning microscope.

In order to achieve these objects, it has been proposed that an acousto-optic element (AOTF, AOF, AOM, or the like), or an electro-optic element (EOM) is utilized (for example, refer to FIG. 2 in AKIS P. GOUTZOULIS and DENNIS R. PAPE DESIGN AND FABRICATION OF ACOUSTO-OPTIC DEVICES, p. 246-258 (1944).

When an ultrasonic wave propagates in a solid body or a liquid, a periodic fluctuation in a refractive index for the light is brought about in parallel with the traveling direction of a sound and with the wavelength of the sound being as a period, by a photoelastic effect in the medium thereof. When a light is incident into the medium, part of the incident light is diffracted by an ultrasonic wave. This phenomenon is called an acousto-optic effect. The principle of operation of an acousto-optic element (AOM, AOTF, AOD, or the like) using this acousto-optic effect is shown in FIG. 2. When a high frequency (RF) voltage is applied to an optical crystal such as $LiNbO_3$, $PbMoO_4$ or $TeO_2$ serving as a medium by attaching a transducer such as a piezoelectric body which transmits ultrasonic waves (RF), a high frequency acoustic wave is generated in the crystal. It is possible to control a transmitted light and a reflected light by utilizing a periodic variation in a refractive index due to the acoustic wave.

On the other hand, a phenomenon that the refractive index of the material is varied when a voltage is applied to a material is called an electro-optic effect. The phase of a light passing through in the material (a crystal such as $LiNbO_3$, KDP, or ADP) is varied by applying a voltage, thereby making it possible to carry out amplitude modulation and phase modulation. One for which such an electro-optic effect is utilized is called an electro-optic element (EOM or the like).

Examples of the use of an acousto-optic element in a laser scanning microscope are shown in FIGS. 3 and 4.

FIG. 3 is a diagram showing an example in which an acousto-optic element 130 is used as high-speed selection (switching) means and lighting control (emission power control mechanism) means for a laser wavelength, and pulse shaping means and shutter means which utilize the switching function thereof. The details of the laser scanning microscope according to the prior art is shown in Jpn. Pat. Appln. KOKAI Publication No. 2000-206415. A plurality of lasers of shorter wavelengths of Ar or ArKr 110a, HeNe 110b and 110c are installed, and the emitted beams of those lasers are synthesized into one beam by a dichroic mirror or the like so as to be incident into the acousto-optic element 130. The acousto-optic element 130 enables wavelength splitting due to the RF frequency control, emission power due to the RF amplitude (voltage) control, and pulse-shaping of a continuous oscillation laser due to the RF-ON/OFF switching control at a high-speed.

FIG. 4 is a diagram showing an example in which a pulse laser which can change wavelengths is used as a laser beam source 110. The acousto-optic element 130 emits a laser of the selected wavelength by controlling an RF frequency in accordance with a selected wavelength of the laser beam source, and enables power control of an emitted beam due to the RF amplitude (voltage) control.

However, a crystal ($LiNbO_3$, $PbMoO_4$ or $TeO_2$) used for the acousto-optic element 130 has the defect that the wavelength dispersion (group velocity delay dispersion; GDD) is extremely great, and the pulse width of a beam after being emitted is spread by the acousto-optic element 130. In a multiphoton excitation laser scanning microscope, the fluorescent luminous intensity is inversely proportional to a pulse width in a case of two photon excitation, and to the square of a pulse width in a case of three photon excitation, which has an extremely large influence.

As a countermeasure against pulse width spreading of an emitted beam due to the wavelength dispersion (GDD) of the acousto-optic element 130, means in PCT National Publication No. 10-512959 is shown in FIG. 5. This is configured such that a pre-chirping optical system 160 is inserted between the pulse laser beam source 110 and the acousto-optic element 130, and spreading of the pulse width after emission of the acousto-optic element 130 or on a plane of a specimen to be observed is offset by carrying out inverse dispersion (pre-chirping) of an amount of the wavelength dispersion (GDD) of the entire optical system up to the time of reaching the acousto-optic element 130 or the specimen to be observed after emission of a laser.

FIG. 6 is a schematic diagram of a typical pre-chirping optical system using prisms. A beam split by a first prism 161 in FIG. 6 is inversely-dispersed by a second prism 162 set to a difference between optical path lengths corresponding to an amount of wavelength dispersion (a divergence in a transmission velocity in a medium by a wavelength within a laser beam band) to pass through the first prism 161, and is made to return to the inside of the microscope illumination optical system, and therefore, the wavelength dispersion inside the illumination optical system can be offset.

More specifically, an amount of compensating dispersion in each wavelength is adjusted by adjusting an interval between the first and second prisms 161 and 162, thereby compensating the group velocity delay dispersion in the entire optical system from the pulse laser beam source 110 to an objective lens 320 of the fluorescent microscope body. At that time, the optical axis is shifted by adjusting the optical path length, and the angle of the optical axis is fluctuated due to a variation in the wavelength. Therefore, the position and the angle of the optical axis of an ultra-short pulse laser beam L to be emitted are adjusted by adjusting the positions and the angles of the prisms 161 and 162, and the mirror 163 as shown by the arrows.

A mirror 165 is shown in FIG. 6. The mirror 165 reflects the ultra-short pulse laser beam L emitted from the pulse laser beam source 110 so as to be orientated to the pre-chirping optical system 160, and is positioned at a position out of the optical axis of the ultra-short pulse laser beam L outputted from the pre-chirping optical system 160.

Next, pulse compression means utilizing an amount of wavelength dispersion (GDD) of the acousto-optic element described in Jpn. Pat. Appln. KOKAI Publication No. 2000-206415 will be described on the basis of FIG. 7. In a laser microscope which uses a pulse laser as the laser beam source 110, and which has an illumination optical system used for introducing an optical fiber 185 into a microscope, it is necessary to sufficiently spread the pulse width and sufficiently decrease the peak power at the incident side of the fiber by a pulse stretcher 180 such as a pre-chirping (inverse dispersion) optical system shown above in order to avoid linear and non-linear dispersive effect which the optical fiber 185 has. However, in a multiphoton excitation laser microscope, the pulse width must be sufficiently narrow in order to obtain a necessary fluorescent luminous intensity as shown above, and the photon density on the plane of the specimen is low in a beam whose pulse width has been spread after passing through a pulse stretcher and a fiber, which makes multiphoton excitation impossible. Then, an optical member having a great amount of wavelength dispersion (GDD), such as, for example, ZnSe, is installed at the emission end of the fiber, and a necessary pulse is obtained by compressing the pulse width. The acousto-optic element as well, as described above, can be used as a pulse compressor in the same way because an amount of wavelength dispersion (GDD) thereof is sufficiently great. Here, the advantage in utilizing the acousto-optic element is in the point that it can be utilized as wavelength splitting means, lighting control (power adjustment) means, and switching means as well.

The acousto-optic element has been mainly described above as the prior art. However, an electro-optic element as well can be applied to a laser scanning microscope in the same way.

BRIEF SUMMARY OF THE INVENTION

An object of the present invention is to provide a laser scanning microscope which has an acousto-optic element or an electro-optic element in an illumination optical system which introduces a laser beam from a laser beam source of the laser scanning microscope into a microscope, wherein the laser scanning microscope effectively and ideally introduces the laser beam from the laser beam source into a microscope.

A laser scanning microscope which includes an acousto-optic element or an electro-optic element in an illumination optical system which introduces a laser beam from a laser beam source of the laser scanning microscope into a microscope, according to an aspect of the invention is characterized by comprising: at least one laser source whose wavelength is tunable; a pre-chirping optical system which corrects spread of a pulse width due to wavelength dispersion of the acousto-optic element or the electro-optic element; a first beam position/angle correcting mechanism which is disposed downstream of the pre-chirping optical system, and which corrects at least one of a beam position and angle of a laser beam incident into the acousto-optic element or the electro-optic element; a beam expander which is disposed downstream of the first beam position correcting mechanism, and which adjusts a beam diameter and a beam divergence angle so that a laser beam is incident to within a diameter of an opening portion of the acousto-optic element or the electro-optic element; a second beam position/angle correcting mechanism which is disposed downstream of the acousto-optic element or the electro-optic element, and which corrects at least one of a beam position and angle of a laser beam emitted from the acousto-optic element or the electro-optic element; and a storage unit which stores at least one correction value of the pre-chirping optical system, first beam position/angle correcting mechanism, beam expander, and second beam position/angle correcting mechanism for correcting at least one of misalignment in an optical axis due to wavelength change of the laser beam, change of beam diameter, and change of beam divergence angle.

A laser scanning microscope which includes an acousto-optic element or an electro-optic element in an illumination optical system which introduces a laser beam from a laser beam source of the laser scanning microscope into a microscope, according to another aspect of the invention is characterized by comprising a beam expander disposed between the laser beam source and the acousto-optic element or the electro-optic element.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 17 is diagram showing a configuration of a main part of a laser microscope according to a modified example of the fifth embodiment of the invention;

FIG. 25 is diagram showing a configuration of a main part of a laser microscope according to a modified example of the sixth embodiment of the invention.

DETAILED DESCRIPTION OF THE INVENTION

Embodiments of the present invention will be described with reference to the drawings.

Figure 8:
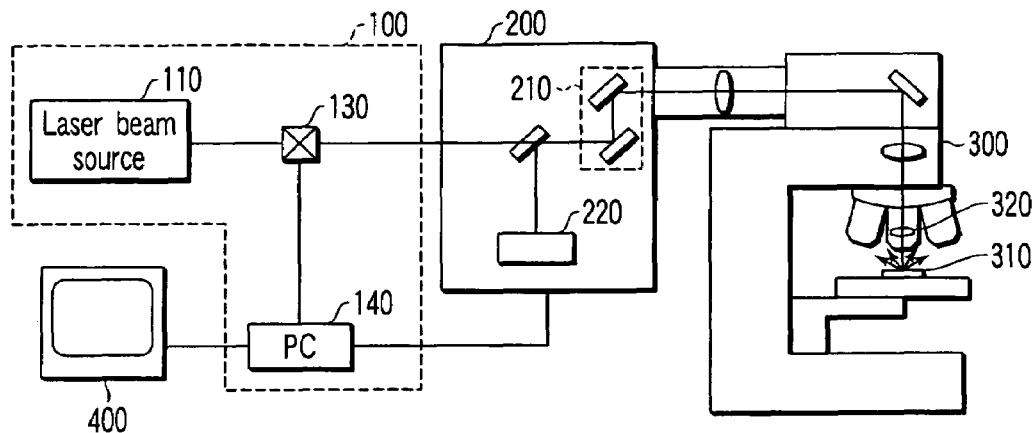
FIG. 8 is a diagram showing a schematic configuration of a laser microscope according to an embodiment of the present invention.

FIG. 8 is a diagram showing a schematic configuration of a laser microscope according to an embodiment of the present invention. FIG. 8 is used in the following respective embodiments, because schematic configurations of laser microscopes in the following embodiments are the same as that in FIG. 8.

The laser scanning microscope has a laser control unit 100, a laser scanning unit 200, and a microscope 300. The laser control unit 100 has a laser beam source 110, an acousto-optic element 130 for carrying out the ON/OFF switching, lighting control and wavelength splitting for a laser beam, and a PC 140 for controlling the operation of the laser microscope. The laser scanning unit 200 has a galvanometer mirror 210 which is a mechanism for causing a laser beam to scan, and a photoelectric transducer 220 for converting fluorescence generated at a specimen 310 into an electric signal. The microscope 300 has an objective lens 320 for observing the specimen 310. Further, a monitor 400 is used for displaying an image to be observed. Further, the PC 140 is connected to the acousto-optic element 130, the galvanometer mirror 210, and the photoelectric transducer 220 via signal conductors.

In the above-described configuration, the laser beam emitted from the laser beam source 110 is incident into the acousto-optic element 130. The acousto-optic element 130 carries out the ON/OFF control, the lighting control, and the wavelength splitting for the laser beam on the basis of an instruction from the PC 140. The laser beam which has passed through the acousto-optic element 130 is controlled so as to deflect the traveling direction by the laser scanning unit 200, and to scan on the two-dimensional plane. Then, the laser beam is incident into the microscope 300, and is made to scan two-dimensionally on the specimen 310 by the objective lens 320. The specimen 310 which has been scanned is optically pumped to generate fluorescence. The generated fluorescence travels through an optical path inversely to the laser beam via the objective lens 320, and is incident into the photoelectric transducer 220 after canceling the deflection by the galvanometer mirror 210. The signal converted at the photoelectric transducer 220 is inputted to the PC 140. The PC 140 configures a fluorescent image of the specimen 310 so as to make a signal showing a scanning state of the galvanometer mirror 210 and a signal from the photoelectric transducer 220 correspond to each other, and displays the image on the monitor 400.

First Embodiment

Figure 9:
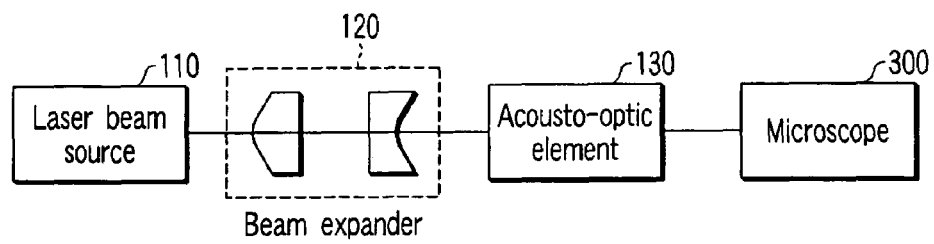
FIG. 9 is a diagram showing a configuration of a main part of a laser microscope according to a first embodiment of the present invention.

FIG. 9 is a diagram showing a configuration of a main part of a laser microscope according to a first embodiment of the present invention. In FIG. 9, the laser scanning unit 200 is omitted, and moreover, the microscope 300 is shown so as to be simplified. Note that this is the same in the following embodiments as well.

In the first embodiment, a beam expander 120 is disposed between the laser beam source 110 and the acousto-optic element 130 (which is may be an electro-optic element. Note that, in the following descriptions, in order to conveniently describe, both of an acousto-optic element and an electro-optic element are simply called "acousto-optic element"). With this configuration, eclipse of the laser beam by the opening of the acousto-optic device 130 is eliminated, and the power output loss of the laser beam by eclipse is eliminated. In addition, the intensity distribution of the emitted beam can be kept equivalent with that of the input beam by adjusting the beam diameter and the beam divergence angle of the laser beam to enter the laser beam into the acoustic wave source region in the opening diameter of acousto-optic device 130 properly by beam expander 120. This is important to generate a correct beam spot in the microscope. However, since the power density of the laser beam exceeds a permissible power density of acousto-optic device 130 when the input beam diameter is too small, it preferable to make the input beam diameter the moderate beam diameter properly controlled on the acoustic wave source region. It is preferable to form the beam waist in the acousto-optic device 130 by the beam expander 120. Thereby, the laser beam becomes near the parallel light flux in acousto-optic device 130 to reduce the extension of the output beam by the angular dispersion of acousto-optic device 130. The laser beam which has been incident into the acousto-optic element 130 is made to have a desired intensity, and is incident into the microscope 300 so as to select only a desired wavelength to be irradiated onto a sample (not shown).

Second Embodiment

Figure 10:
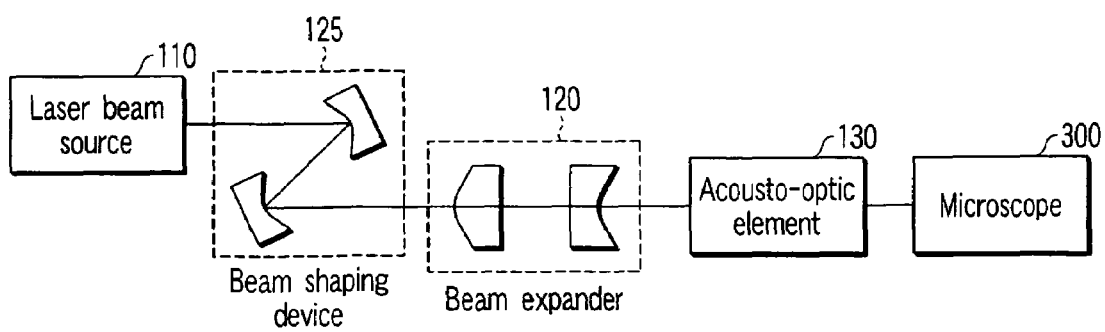
FIG. 10 is a diagram showing a configuration of a main part of a laser microscope according to a second embodiment of the present invention.

FIG. 10 is a diagram showing a configuration of a main part of a laser microscope according to a second embodiment of the present invention. In FIG. 10, same portions which are the same as those of FIG. 9 are denoted by the same reference numerals. In the second embodiment, a beam shaping device 150 using concave mirrors is added as a laser beam shaping device to the configuration of the first embodiment. In this way, the second embodiment has the feature that the laser beam shaping device is disposed downstream of laser output (i.e., between the laser beam source and the beam expander). Hereinafter, the necessity of the laser beam shaping device will be described.

First, a cross-sectional shape of a normal output light from the laser beam source (i.e., a beam shape) will be schematically described with reference to FIG. 11.

Figure 11:
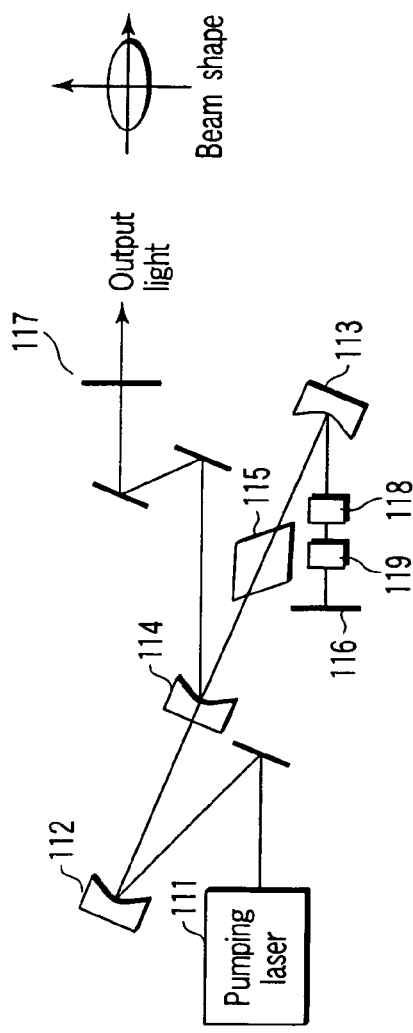
FIG. 11 is a diagram for explanation of a cross-sectional shape of a normal output light from a laser beam source (i.e., a beam shape)

FIG. 11 is shows an internal configuration of the pulsed laser which can change the wavelength used as a laser light source of the multiphoton excitation laser scanning microscope.

The laser beam which is emitted from a pumping laser 111 and set to an excitation wavelength of a laser crystal 115 is condensed onto a laser crystal 115 in a resonator by a condensing mirror 112, and the laser crystal 15 irradiates. Wavelength split oscillation light is emitted from a laser housing (not shown) such that the irradiated light is repeatedly made to resonate between a high-reflecting mirror 116 and an output coupling mirror 117. At that time, because the concave condensing mirrors 113 and 114 for condensing light in the resonator onto the laser crystal 115 are disposed in a Z shape, the curvatures of the beam in the cross-sectional direction are different. Therefore, a beam having an elliptic cross-sectional shape, i.e., whose beam diameter position, beam diameter, and divergence angle are shifted as shown in FIG. 11 is emitted. On the other hand, in order for the laser beam to be effectively incident into the acousto-optic element, the cross-sectional shape of the laser beam is preferably varied from the ellipse into a circle. The pre-chirping optical system 118 is optical system to compensate the wavelength dispersion in the resonator and the acousto-optic device 119 is an element to select oscillation wavelength, and to control the mode-locking. As a result, the oscillation light becomes a laser beam with narrow pulsewidth in which the wavelength is selected.

The embodiment has the feature that a beam shaping device 125 using concave mirrors is added in a direction opposite to the curvature of the inside of the laser housing after emission from the laser beam source 110, and consequently, misalignment in the cross-sectional direction of the beam emitted from the beam laser beam source 110 as described above can be solved.

The beam which has passed through the beam shaping device 125 using concave mirrors becomes an ideal Gaussian beam whose cross-sectional shape is a circle and the wavefront is uniform. Therefore, even the beam which has passed through the internal optical systems of the beam expander 120 and the microscope 300 shown in the first embodiment is more accurately condensed onto the plane of the specimen. This is particularly effective in a microscopy method in which an excitation efficiency depends on a photon density of a beam condensed by an objective lens, and by which a three-dimensional effect is obtained, as in a case of a multiphoton excitation laser scanning microscope. Note that the beam shaping device 125 using concave mirrors is preferably disposed directly behind the laser housing in order to avoid the influence by the following optical systems. Further, shaping during a time at a specific wavelength is possible due to a lens configuration of a cylindrical lens or the like. However, in a case of a pulse laser, a concave mirror is most preferable because the influence by wavelength dispersion (GDD) of a lens, switching of a plurality of wavelengths, or an adjustment for a lens interval by a wavelength in the selected laser beam source 110 are brought about. Further, the use of the beam shaping device 125 using concave mirrors is naturally effective in an illumination optical system of a laser scanning microscope which does not use the acousto-optic element 130.

Third Embodiment

Figure 12:
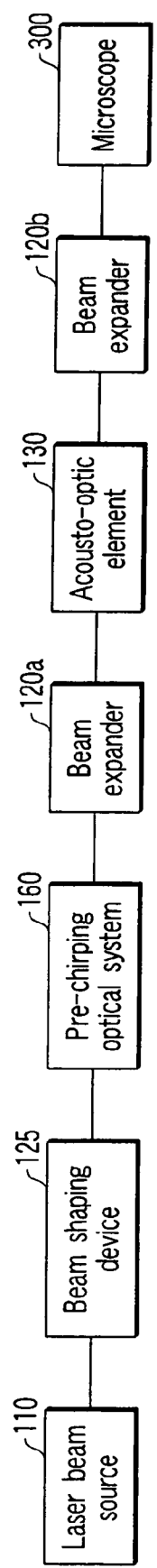
FIG. 12 is diagram showing a configuration of a main part of a laser microscope according to a third embodiment of the present invention.

FIG. 12 is a diagram showing a configuration of a main part of a laser microscope according to a third embodiment of the present invention. Note that, in FIG. 12, same portions which are the same as those of FIGS. 9 and 10 are denoted by the same reference numerals. The third embodiment has the feature that the beam expander 120a is provided upstream of the acousto-optic element 130 and the beam expander 120b is provided downstream of the acousto-optic element 130.

Figure 1:
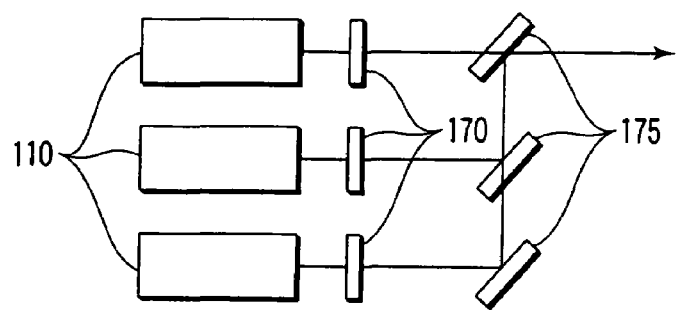
FIG. 1 is a diagram showing an example of a laser beam source for outputting an excitation laser beam having a plurality of wavelengths.
Figure 2:
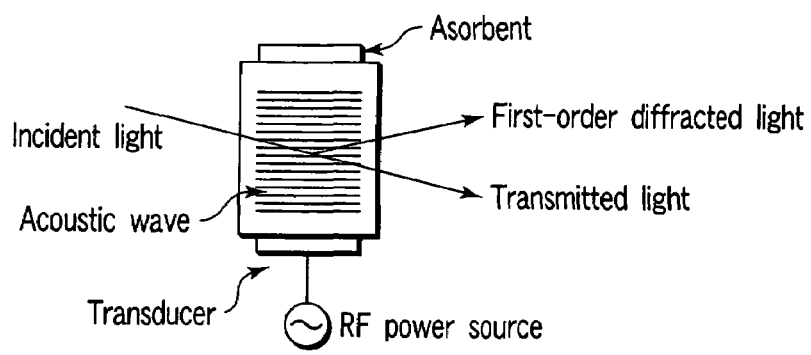
FIG. 2 is a diagram showing the principle of operation of an acousto-optic element (AOM, AOTF, AO, or the like) utilizing an acousto-optic effect.
Figure 3:
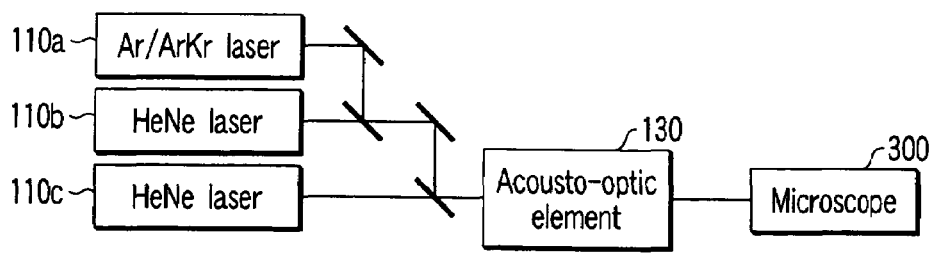
FIG. 3 is a diagram showing an example of the use of an acousto-optic element in a laser scanning microscope.
Figure 4:
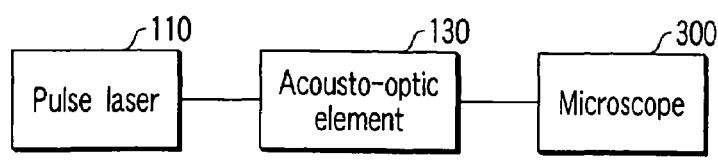
FIG. 4 is a diagram showing an example of the use of an acousto-optic element in a laser scanning microscope.
Figure 5:
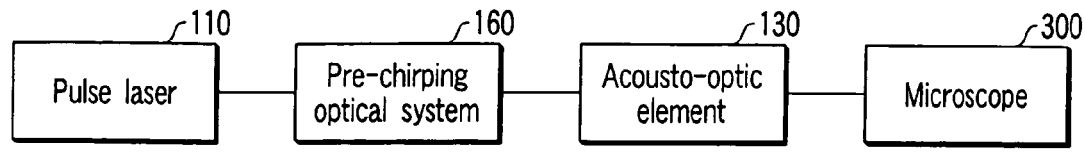
FIG. 5 is a diagram showing countermeasure means against spreading of a pulse width of an emitted beam by wavelength dispersion (GDD) of an acousto-optic element in a prior art.
Figure 6:
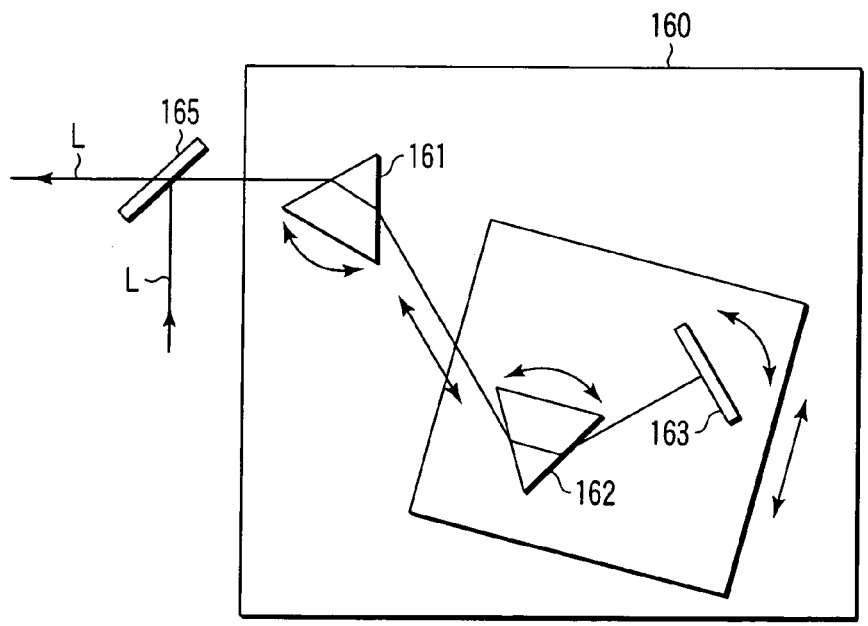
FIG. 6 is a schematic diagram of a typical pre-chirping optical system using prisms.
Figure 7:
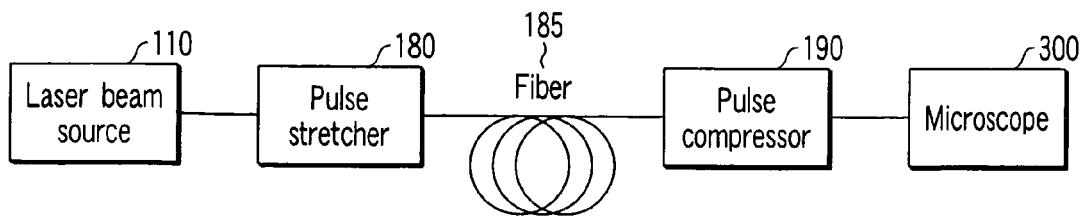
FIG. 7 is a diagram for explanation of pulse compressing means utilizing an amount of wavelength dispersion (GDD) of the acousto-optic element.

The beam expander 120b provided downstream of the acousto-optic element 130 will be described, The beam diameter and the beam divergence angle of the laser beam suitably shaped by the beam expander 120a for acousto-optic device 130 may not be proper for the pupil diameter of the objective lens 320 in the microscope 300 and for improvement of the multiphoton excitation efficiency. Therefore, means for adjusting the beam diameter and the beam divergence angle of the laser beam after being emitted from the acousto-optic device 130 is required, and the beam expander 120b placed downstream of the acousto-optic device 130 in FIG. 12 serves as this means. Since the laser beam in which the beam diameter and the beam divergence angle are properly adjusted for at least the pupil diameter of objective lens 320 is incident to the microscope 300 by the beam expander 120b, important problems at observation of the specimen such as shift of the focal position and of decrease in the resolution are avoided. At change of wavelength of laser light source 110 and at change of the light sources when a plurality of laser light sources 110 are used as shown in FIG. 1, the laser beam can be condensed to the same focal position even when the wavelength is changed, by properly adjusting the beam diameter and the beam divergence angle of the laser beam by the beam expander 120b for the pupil diameter of the objective lens 320 in every case.

If The beam diameter of the emitted laser beam from acousto-optic device 130 is small enough compared with the diameter in the opening of the acousto-optic device 130 there is eclipse of the beam by the opening, the beam expander 120a arranged at preceding stage of the acousto-optic device 130 might become unnecessary when laser power enough for the specimen observation can be obtained. Moreover, in FIG. 12, the pre-chirping optical system 160 that compensates the pulsewidth change by the wavelength dispersion upstream of the acousto-optic device 130 is arranged. If the laser beam can be incident to the acousto-optic device 130 without the influence due to the beam divergence by using pre-chirping-optical system 160 by arranging the pre-chirping optical system 160 downstream of the acousto-optic device 130, the beam expander 120a in preceding stage of the acousto-optic device 130 might be omitted.

Fourth Embodiment

Figure 13:
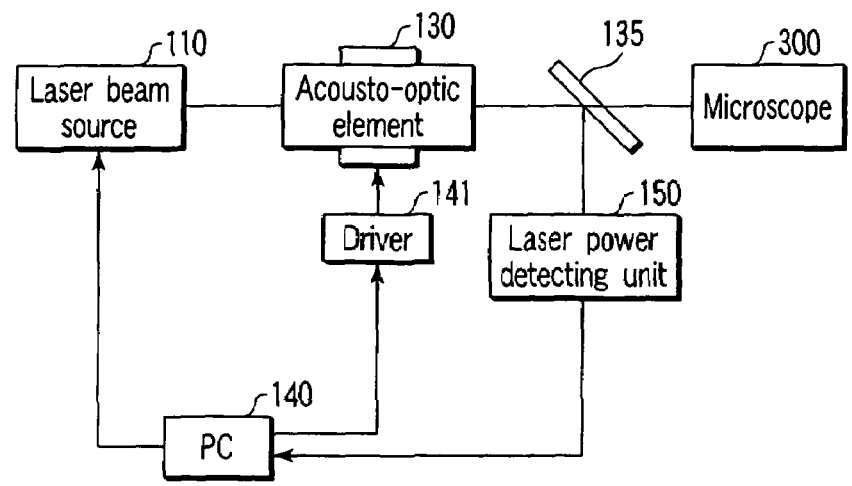
FIG. 13 is diagram showing a configuration of a main part of a laser microscope according to a fourth embodiment of the present invention.

FIG. 13 is a diagram showing a configuration of a main part of a laser microscope according to a fourth embodiment of the present invention. Note that, in FIG. 13, same portions which are the same as those of FIGS. 9 to 12 are denoted by the same reference numerals. The fourth embodiment has the feature that optimum modulation input signals in respective wavelengths of a laser beam from a laser beam source are automatically calculated.

By transmitting a switching signal for wavelength splitting to the laser beam source 110 by the PC 140, a laser oscillating wavelength at the laser beam source 110 is selected, and a light having a single wavelength is emitted. The laser beam emitted from the laser beam source 110 is incident into the acousto-optic element 130. The acousto-optic element 130 carries out the ON/OFF control, the lighting control, and the wavelength splitting onto the laser beam on the basis of a frequency and an amplitude of a modulation input signal (RF signal) from a driver 141. The laser beam which has passed through the acousto-optic element 130 is split into two optical paths at a beam splitter 135c, and the split beams are respectively incident into a detecting unit 150c and the microscope 300. Here, the laser beam incident into the detecting unit 150c is photoelectric-transferred to be inputted to the PC 140. The PC 140 is configured so as to designate an amplitude and a frequency of a modulation input signal with respect to the driver 141. The PC 140 varies the amplitude and the frequency of the modulation input signal while always monitoring the photoelectric-transferred signal from the detecting unit 150c, and calculates the amplitude and the frequency of the modulation input signal by which a value of the photoelectric-transferred signal is made maximum.

Accordingly, an optimum modulation input frequency for each selected wavelength (an RF frequency when the intensity from the acousto-optic element 130 becomes maximum) and an optimum modulation input frequency for each selected voltage (an RF voltage when the intensity from the acousto-optic element 130 becomes maximum) can be automatically detected.

Fifth Embodiment

Figure 14:
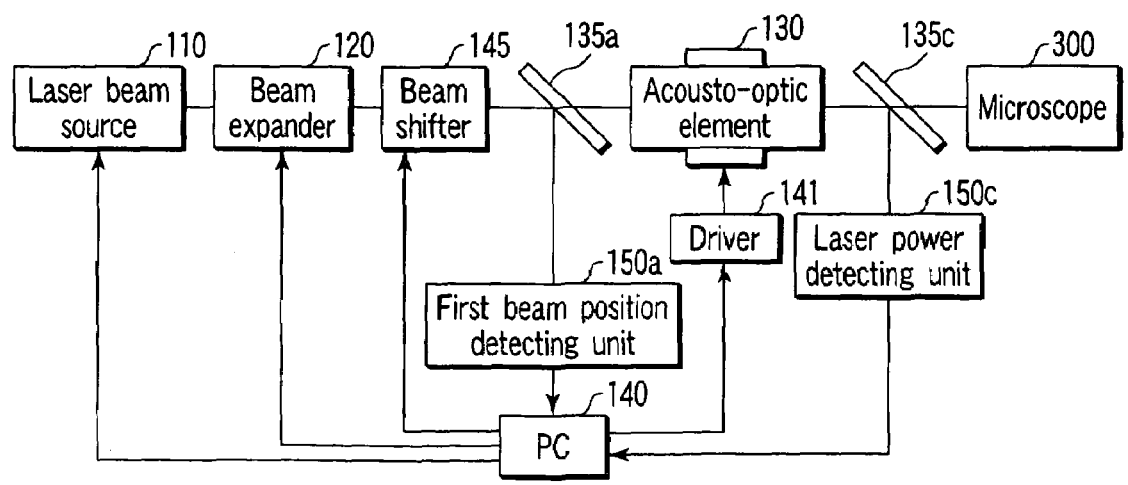
FIG. 14 is diagram showing a configuration of a main part of a laser microscope according to a fifth embodiment of the present invention.

FIG. 14 is a diagram showing a configuration of a main part of a laser microscope according to a fifth embodiment of the present invention. Note that, in FIG. 14, same portions which are the same as those of FIGS. 9 to 13 are denoted by the same reference numerals. The fifth embodiment has the feature that a beam diameter and positional misalignment at the time of switching wavelengths of a laser beam are automatically corrected.

In the fifth embodiment, as shown in FIG. 14, a beam expander 120, a beam shifter 145, a beam splitter 135a, and a position detecting unit 150a such as a CCD are added to the fourth embodiment. The beam expander 120 makes a beam diameter and a beam divergence angle of a laser beam variable. The beam shifter 145 can move a beam of a laser beam in parallel, and can vary the angle. The beam splitter 135a splits an optical path to the acousto-optic device 130 for carrying out the ON/OFF switching, the lighting control, and the wavelength splitting for a laser beam. The position detecting unit 150a senses a position of a beam of a laser beam.

The beam expander 120 is configured by combining a mechanism which makes a beam diameter and a divergence angle of a laser beam variable by adjusting a rotary knob, for example, for changing a position of an optical axis direction of the lens group (not shown) arranged inside thereof, and a position detecting sensor and a motor both for rotary knob are combined.

Figure 15:
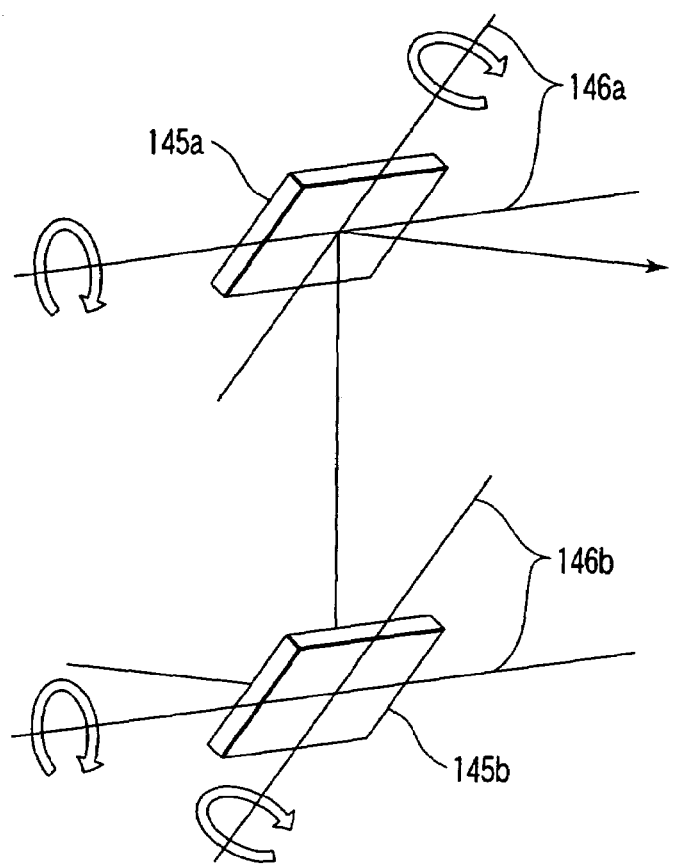
FIG. 15 is a diagram showing an example of a configuration of a beam shifter.

Further, an example of a configuration of the beam shifter 145 is shown in FIG. 15. As shown in FIG. 15, the beam shifter 145 is configured to combine two plane mirrors 145a and 145b, and a position detecting sensor and a motor, which are not shown.

Figure 16:
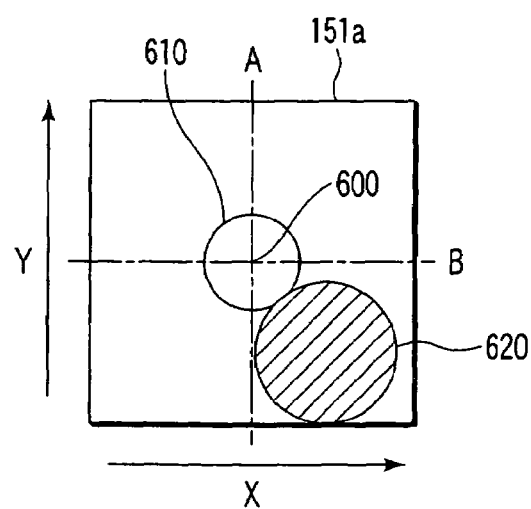
FIG. 16 is a view showing a relationship between an element of a detecting unit and a beam spot.

In a laser microscope configured as described above, in the same way as the fourth embodiment, a switching signal for wavelength splitting is transmitted from the PC 140 to the laser beam source 110, and a laser oscillating wavelength from the laser beam source 110 is selected, so that a light having a single wavelength is emitted. The laser beam emitted from the laser beam source 110 passes through the beam expander 120 which makes a beam diameter and a beam divergence angle of a laser beam variable, and the beam shifter 145 which enables parallel movement of a beam, and variation in the angle of the beam of a laser beam. The laser beam which has been passed is split at the beam splitter 135a, and the split laser beams are respectively incident into the detecting unit 150a and the acousto-optic element 130. The beam splitter 135a and the detecting unit 150a are disposed such that the center of a beam spot 610 of the laser beam is coincident with a center 600 on an element 151a of the detecting unit 150a, as shown in FIG. 16, when a laser beam is incident with an optimum diameter into an optimum position of the acousto-optic element 130. The light incident into the detecting unit 150a is photoelectric-transferred, and brightness information on each pixel of the element 151a is inputted to the PC 140. The PC 140 outputs pulse signals for driving the beam expander 120 and the mirrors 145a and 145b of the beam shifter 145 to respective driving units. The beam shifter 145 is configured such that the motors drive the X-axes and the Y-axes on the respective axes with broken lines 146a and 146b of FIG. 15 being as axes, and the beam moves in parallel when the planes of the two mirrors 145a and 145b are inclined respectively at a same angle. Note that, because the operation after the beam has been incident into the acousto-optic element 130 is the same as those in the fourth embodiment, it will be omitted.

A procedure of optimization by adjustment after switching wavelengths will be described with reference to FIG. 16.

1. The laser beam is moved in parallel such that the center of an ideal beam spot 610 and the center of an actual beam spot 620 are coincident with each other by the beam shifter 145.

2. The diameter of the ideal beam spot 610 and the diameter of the actual beam spot 620 are adjusted so as to be a same size by the beam expander 120.

3. Optimization by adjustment of a modulation input signal is carried out by the method described in the fourth embodiment.

Optimization can be carried out in accordance with the above-described procedure. The concrete adjustment method is as follows.

The method in which a laser beam is moved in parallel to the central position by using the beam shifter 145 is as follows. While the PC 140 is always monitoring a photoelectric-transferred signal from the detecting unit 150a, the mirrors are driven centering around two axes 504 of the mirrors by the motors in a state in which the parallel state of the planes of the mirrors 145a and 145b are always maintained such that the central coordinate of the beam spot 620 irradiated onto the element 151a is moved to the center 600. Note that, a method for determining the central coordinate of the beam spot 620 includes various methods such as a method in which, supposing that a beam is a Gaussian type, a coordinate whose intensity is the highest is determined as the central coordinate, and a method in which, supposing that a beam is a perfect circle, for example, an intermediate coordinate between the respective maximum values and minimum values of the X-coordinate and the Y-coordinate is determined as the central coordinate.

The method for adjusting a diameter of a laser beam by the beam expander 120 is as follows. While the PC 140 is always monitoring a photoelectric-transferred signal from the detecting unit 150a, the rotary knob of the beam expander 120 is driven such that the beam spot 620 of the laser irradiated onto the element 151a is made same as the diameter of the ideal beam spot 610. As a method for determining a size of a beam diameter, for example, there is a method in which, supposing that a beam spot is a perfect circle, a size of the beam diameter is determined to be a difference between a maximum value and a minimum value of the X-coordinate. Further, in a case where there is no variation in a beam diameter by switching wavelengths, the beam expander 120 may be fixed as it is once after being adjusted, and may be not adjusted thereafter.

In accordance with the fifth embodiment, in addition to the fourth embodiment, it is possible to automatically introduce a laser beam up to the microscope at maximum efficiency even in a case where the positions of the beams are moved in parallel or the beam diameter is varied by switching the wavelengths of the laser source 110.

Modified Example of the Fifth Embodiment

FIG. 17 is a block diagram showing a schematic configuration of a modified example of the fifth embodiment.

In FIG. 17, a second beam shifter 145b and a beam splitter 135d are inserted on the optical path between the beam splitter 135c and the microscope 300. Here, the beam positions of the beams split at the beam splitter 135d have been detected at a third beam position detecting unit 150d.

In the modified example, because not only the beam position of the beam inputted to the acousto-optic element 130, but also the beam position of the beam outputted from the acousto-optic element 130 are detected, a fluctuation in an alignment caused by the acousto-optic element (i.e., a local variation in a thermal refractive index due to an application of an RF voltage) is removed, and the optical axis of the laser beam can be made close to the designed optical axis of the microscope, which improves the efficiency of multiphoton excitation.

Sixth Embodiment

Figure 18:
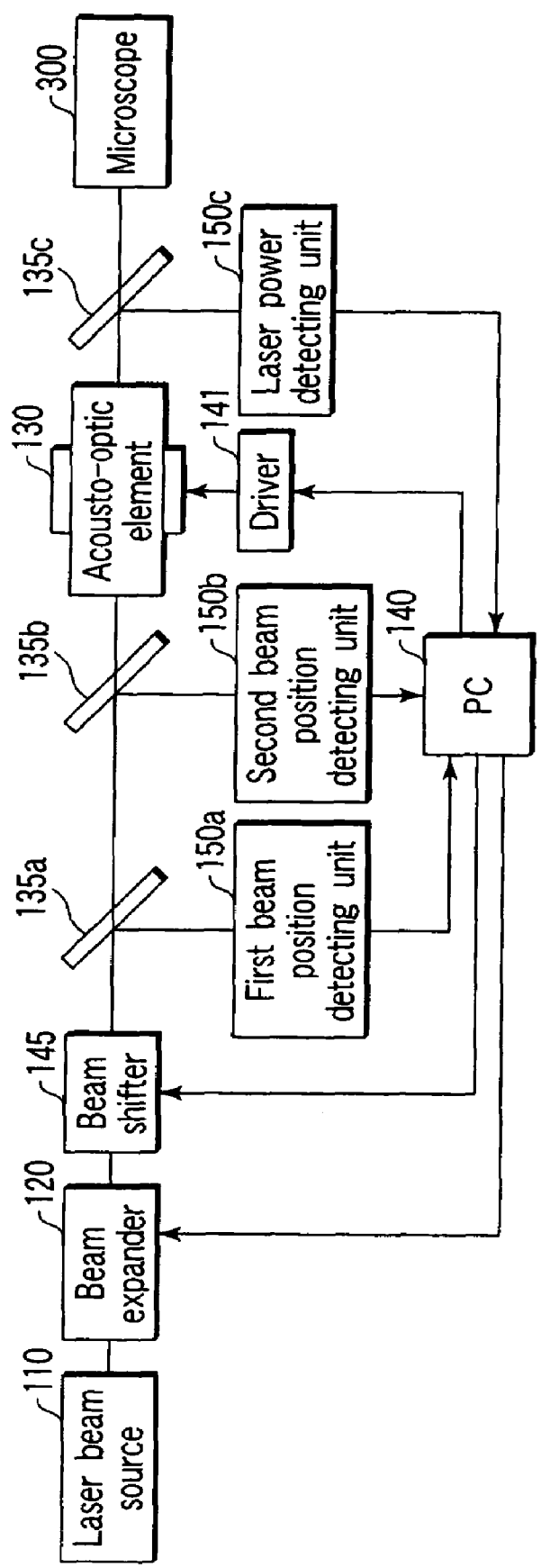
FIG. 18 is diagram showing a configuration of a main part of a laser microscope according to a sixth embodiment of the present invention.

FIG. 18 is a diagram showing a configuration of a main part of a laser microscope according to a sixth embodiment of the present invention. Note that, in FIG. 18, same portions which are the same as those of FIGS. 9 to 14 are denoted by the same reference numerals. The sixth embodiment has, in addition to those of the fourth and fifth embodiments, the feature that change of divergence angle and angular misalignment of a beam at the time of switching wavelengths of the laser beam source are automatically corrected.

In the laser microscope according to the sixth embodiment, two beam splitters 135a and 135b and detecting units 150a and 150b such as CCDs are added to the laser microscope according to the fifth embodiment. The beam splitters 135a and 135b are provided between the beam shifter 145 and the acousto-optic element 130, and the detecting units 150a and 150b are provided on the reflection optical paths of the respective beam splitters 135a and 135b, and detect the beam positions. Hereinafter, the operation of the laser microscope according to the sixth embodiment will be described.

Figure 19:
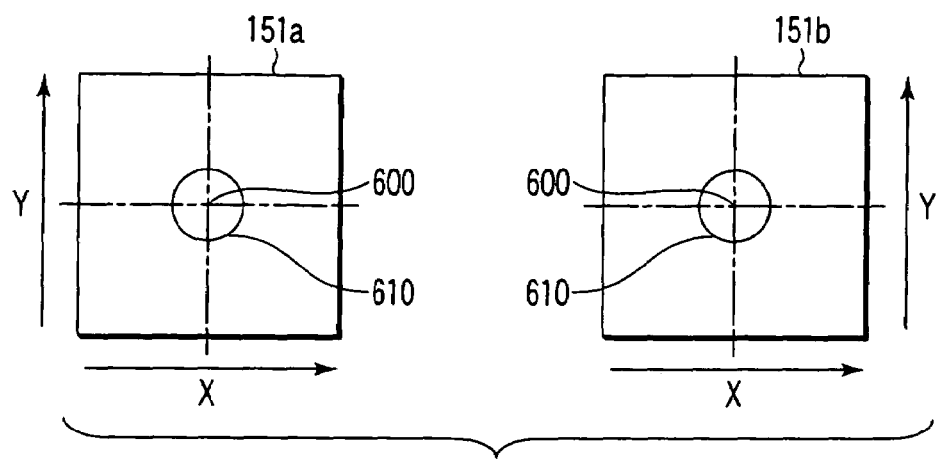
FIG. 19 is a view showing a relationship between elements of detecting units and beam spots.
Figure 20:
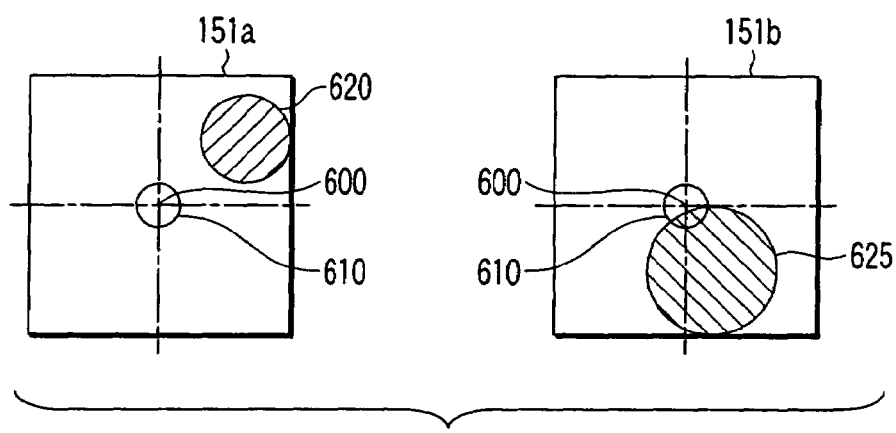
FIG. 20 is a view showing a relationship between elements of detecting units and beam spots.
Figure 21:
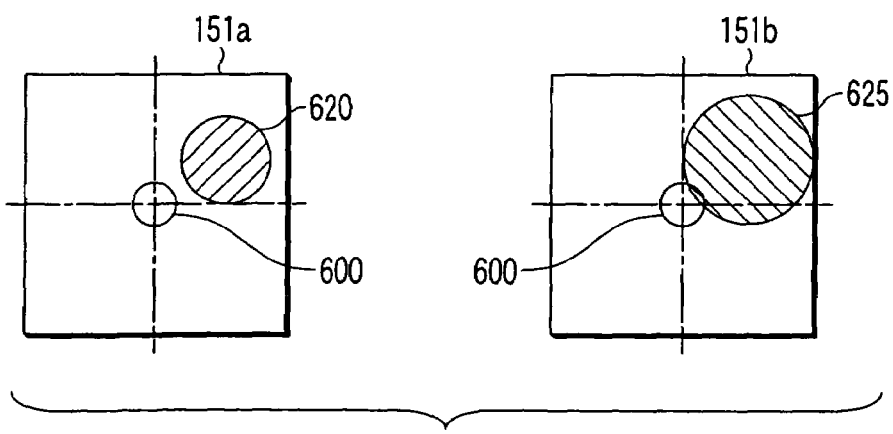
FIG. 21 is a view showing a relationship between elements of detecting units and beam spots.
Figure 22:
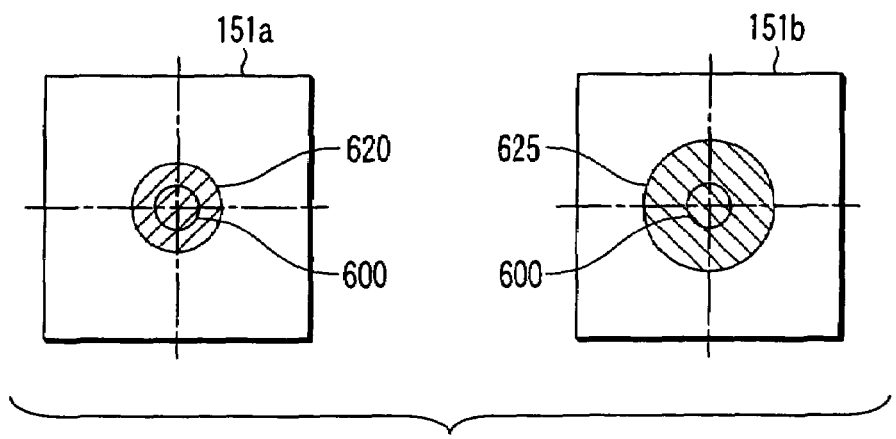
FIG. 22 is a view showing a relationship between elements of detecting units and beam spots.
Figure 23:
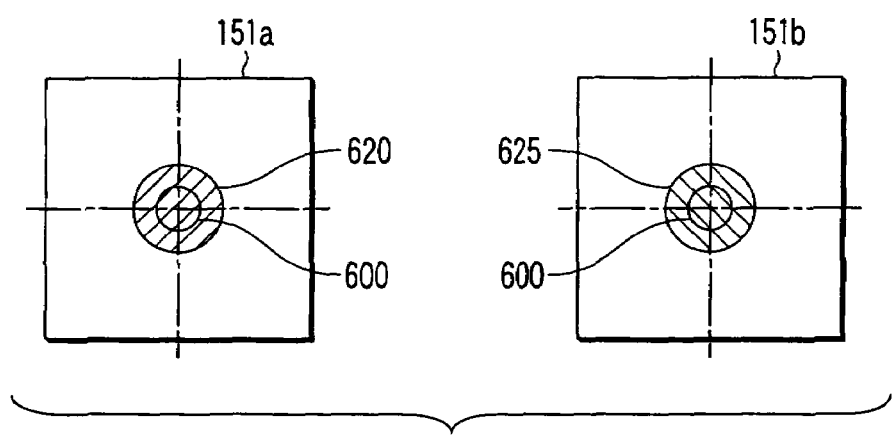
FIG. 23 is a view showing a relationship between elements of detecting units and beam spots.
Figure 24:
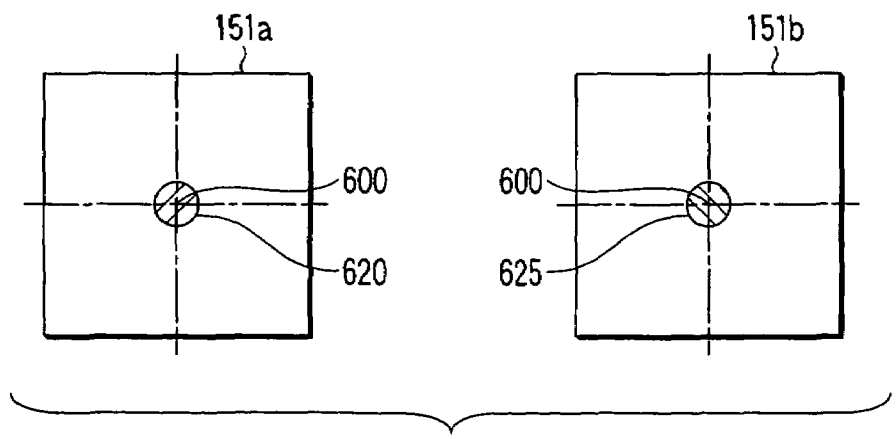
FIG. 24 is a view showing a relationship between elements of detecting units and beam spots.

In the same way as in the fifth embodiment, the laser beam emitted from the laser beam source 110 passes through the beam expander 120 and the beam shifter 145. Thereafter, the laser beam is split at the beam splitter 135a, and the split beams are respectively incident into the detecting unit 150a and the acousto-optic element 130. The beam splitters 135a and 135b, and the detecting units 150a and 150b are installed such that the centers 600 on the element 135a of the detecting unit 150a and the element 151a of the detecting unit 150a, and the center of the beam spots 620 of the laser beams are coincident with one another, as shown in FIG. 19, when a laser beam is incident with an optimum diameter and in an optimum angle, into an optimum position of the acousto-optic element 130. The lights incident into the detecting units 150a and 150b are photoelectric-transferred, and brightness information on each pixel of the element 151a of the detecting unit 150a and the element 151b of the detecting unit 150b is inputted to the PC 140. The PC 140 outputs pulse signals driving the beam expander 120 and mirrors 145a and 145b of the beam shifter 145 to respective driving units. The beam shifter 145 is configured such that the motors drive the X-axes and the Y-axes on the respective axes with the broken lines 146a and 146b of FIG. 15 described above being as axes. When the two mirrors 145a and 145b are driven to be respectively inclined at a same angle, the beam moves in parallel, and the beam angle can be changed by driving one of the mirrors. Note that, because the operation after the beam has been incident into the acousto-optic element 130 is the same as that in the fourth embodiment, it will be omitted.

A procedure of optimization by adjustment after switching wavelengths will be described with reference to FIGS. 20 to 24.

1. An inclination of the laser beam is varied such that the center of the beam spot 620 of the element 151a and an center 625 of an beam spot of the element 151b are coincident with each other by the beam shifter 145 (refer to FIG. 20 (before change), and FIG. 21 (after change)).

2. By a method which is the same as the method described in the fifth embodiment, the laser beam is moved in parallel such that the center of the beam spot 620 of the element 151a and the center 625 of the beam spot of the element 151b are coincident with each other by the beam shifter 145 (refer to FIG. 21 (before change), and FIG. 22 (after change)).

3. The beam-divergence angle of the laser beam is made to vary such that the diameter of the beam spot 625 of the element 151b is coincident with the diameter of the beam spot 620 of the element 151a by the beam expander 120 (refer to FIG. 22 (before change), and FIG. 23 (after change)).

4. By a method which is the same as the method described in the fifth embodiment, the beam diameter is made to vary such that the diameter of the ideal beam spot 610 and the diameters of the actual beam spots 620 and 625 are made so as to be a same size by the beam expander 120 (refer to FIG. 23 (before change), and FIG. 24 (after change)).

5. Optimization by adjustment of a modulation input signal is carried out by a method which is the same as the method described in the fourth embodiment.

Optimization can be carried out in accordance with the above-described procedure. The concrete adjustment method is as follows.

The method in which the center of the beam spot 620 irradiated on the element 151a and the center 600 of the beam spot irradiated on the element 151b are coincident with each other by the beam shifter 145 is as follows. While the PC 140 is always monitoring photoelectric-transferred signals from the detecting units 150a and 135b, only the mirror 145a is driven centering around the two axes 504 of the mirrors by the monitors such that the central coordinates of the beam spots 620 and 625 are made to be the same. Note that, a method for determining the central coordinates of the beam spots 620 and 625 is the same as that described in the fifth embodiment.

The method for adjusting the beam divergence angle by the beam expander 120 is as follows. While the PC 140 is always monitoring a photoelectric-transferred signal from the detecting unit 150a, the rotary knob of the beam expander 120 is driven such that the diameter of the beam spot 625 irradiated onto the element 151b is made to be the same as the diameter of the ideal beam spot 620 irradiated onto the element 151a. Note that a method for determining a size of a beam diameter and other adjustments are the same as those described in the fifth embodiment. Further, in a case where there is no variation in a beam diameter by switching wavelength, and no spread of the beam, the beam expander 120 may be fixed as it is once after being adjusted, and may be not adjusted thereafter.

In accordance with the sixth embodiment, it is possible to automatically introduce the laser beam up to the microscope with maximum efficiency even in a case where an angle of emitting the beam is changed by switching the wavelengths of the laser, or a divergence angle of the laser beam is varied. The other effects are the same as those in the fifth embodiment.

Modified Example of the Sixth Embodiment

FIG. 25 is a block diagram showing a schematic configuration of a modified example of the sixth embodiment.

In FIG. 25, a second beam shifter 145b and beam splitters 135d and 135e, are inserted on the optical path between the beam splitter 135c and the microscope 300. The beam positions of the beams split at the beam splitters 135d and 135c have been detected at third and fourth beam position detecting units 150d and 150e.

In the modified example, because not only a correction in a beam position in the modified example of the fifth embodiment, but also a correction in an angle of the laser beam are possible, further effect can be obtained.

Seventh Embodiment

In a seventh embodiment of the present invention, a function is added in which correction values and optimum values for respective portions for each wavelength of a laser beam are stored in advance in a PC, and in a case of using the stored wavelengths again, a correction in a diameter of the laser beam, or the like is carried out by using the stored correction values and optimum values. Note that the present embodiment can be applied to a case where adjustments of the respective portions have not been made automatically, but the adjustments of the respective portions have been manually made.

Because a configuration of a laser microscope according to the seventh embodiment is the same as that of FIGS. 13, 14, 17, 18, and 25, illustration thereof is omitted. Note that, in the embodiment, for example, a storage device (not shown) for the PC 140 is used for storage.

For example, when the adjustments of the respective portions are completed in accordance with those described in the fourth to sixth embodiments and the modifications thereof, the storage device of the PC 140 stores, for example:

a wavelength of a laser beam currently selected;
an angle position of the rotary knob of the beam expander 120;
rotation angles of the X and Y-axes of the mirrors 145a and 145b of the beam shifter 145;
a frequency and/or amplitude of a modulation input signal which the driver 141 provides to the acousto-optic element 130; and
an adjustment amount of the beam shifter 145b arranged downstream of the acousto-optic element.

Examples of the correction values stored in the storage device will be shown hereinafter.

(1) A direction and a position of prisms (dispersive device), and a direction of a reflecting mirror and/or dispersion compensation amount in order for a beam to correctly reciprocate in the pre-chirping optical system, (2) An adjustment amount of the beam shifter 145, 145a for optimizing the position of the beam incident to the acousto-optic element 130, (3) An adjustment amount of beam expander 120 for optimizing the beam diameter incident to the acousto-optic element, and/or the beam divergence angle, (4) An adjustment amount of the beam shifter 145b for making the position of the beam emitted from acousto-optic element coincident with an optical system downstream; and (5) An adjustment amount of the modulation input signal given to the acousto-optic element 130.

Item (1) shows a case the multiphoton excitation microscope has the pre-chirping optical system downstream of the laser source.

When the data for each wavelength of the laser beam described above are stored in the storage device, it is determined whether or not the selected wavelength of the laser has been stored in the storage device in a case of switching the laser wavelength to a desired wavelength. When there is no data relating to the wavelength in the storage device, the adjustments of the respective portions are carried out in accordance with those described in the fourth to sixth embodiments. Note that the adjustments of the respective portions are not the automatic adjustments, but the above-described adjustments of the respective portions are manually carried out; the data of the respective portions after the adjustments are stored as adjustment data; and the data may be stored as adjustment data.

If the selected wavelength of the laser beam has been stored in the storage device, the adjustment data of the respective portions relating to the wavelength are read out of the storage device, and the adjustment data are provided to the respective portions.

As described above, the adjustments of the respective portions are carried out once by a wavelength, and the data of the respective portions at that time are stored as adjustment data with respect to the wavelength. Consequently, there is no need to carry out adjustments of the respect portions again every time of switching a wavelength at the time of using the wavelength again, which enables optimization of the respective portions which need to be rapidly adjusted after switching a wavelength.

The present invention is not limited to the above-described respective embodiments, and at the stage of implementing the invention, various modifications can be executed within a range which does not deviate from the gist of the present invention.

In the above-described embodiments, a pulsed laser whose wavelength tunable has been supposed as the laser beam source 110. However, single color lasers shown in FIG. 1 may be combined with the dichroic mirror, and an output wavelength may be switched by a shutter.

Further, in the fourth to seventh embodiments, a beam shaping device using concave mirrors serving as a laser beam shaping device as shown in the second embodiment, or a pre-chirping optical system as shown in the third embodiment may be provided. Note that, when a beam shaping device using concave mirrors is provided, it is preferably provided between the laser beam source 110 and the beam expander 120.

Moreover, in the first embodiment and fourth to seventh embodiments, a beam expander 120b may be provided downstream of the acousto-optic element 130, as shown in the third embodiment.

In accordance with the above-described embodiments, the following effects can be obtained.

(1) Because the beam expander has been disposed upstream of the acousto-optic element, there is no eclipse due to the opening portion of the acousto-optic element, and the power of a laser beam can be efficiently used. Further, it is possible to reduce the influence of the angular dispersion of the acousto-optic element, and to suppress of a beam spreading.

(2) The cross-section and the wavefront of a beam are made to be ideal shapes by the beam shaping device using concave mirrors disposed directly behind the emission of laser, whereby the propagation of the beam of the illumination optical system and the condensing on the plane of the specimen can be ideally shaped.

(3) The position and the angle of a beam incident into the acousto-optic element is adjusted by the beam position detecting unit disposed upstream of the acousto-optic element, or the laser power detecting units disposed downstream of the acousto-optic element, and the beam position and angle correcting mechanism disposed upstream of the acousto-optic element, whereby the power of the beam emitted from the acousto-optic element can be adjusted efficiently (at a maximum).

(4) The pre-chirping optical system correcting the spreading of the pulse width by the wavelength dispersion of the acousto-optic element is arranged downstream of the acousto-optic element, whereby an optical path length from the laser beam source to the acousto-optic element is made short, and an unnecessary spread of the incident beam is made minimum, which can omit the beam expander upstream of the acousto-optic element, and simplify the illumination optical system.

(5) A beam incident into the microscope can be adjusted into an appropriate beam diameter and beam divergence angle by the beam expander disposed downstream of the acousto-optic element.

(6) Because an optimum modulation input frequency and an optimum modulation input voltage for each selected wavelength is automatically detected, a maximum output is obtained.

(7) Because optimum values (correction values) with respect to the respective wavelengths are stored, after making an adjustment by a wavelength once, there is no need to make adjustments of the respective portions again when the wavelength is used again, which enables optimizations for respective portions which need to be rapidly adjusted after tuning a wavelength.

As described above, in accordance with the embodiments of the present invention, since a laser beam emitted from a laser beam source is ideally shaped and introduced into a microscope, it is possible to more effectively exhibit the optical performance of the microscope.

Moreover, inventions at various stages are included in the above-described embodiments, and various inventions can be sampled by appropriately combining a plurality of structural requirements to be disclosed.

Further, for example, even if some of the structural requirements are omitted from all of the structural requirements shown in the respective embodiments, provided that the problems described in the "Problems to be Solved by the Invention" section of the application can be solved and the effects described in the "Effects of the Invention" of the application can be obtained, the configuration from which the structural requirements have been omitted can be sampled as the present invention.

In accordance with the present invention, there can be provided a laser scanning microscope which comprises an acousto-optic element or an electro-optic element in an illumination optical system which introduces a laser beam from a laser beam source of the laser scanning microscope into a microscope, wherein the laser scanning microscope effectively and ideally introduces a laser beam from the laser beam-source into the microscope.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multiphoton excitation observation apparatus comprising:
   an ultra-short pulse laser light source which emits an ultra-short pulse laser beam;
   a microscope main body in which the ultra-short pulse laser beam emitted from the ultra-short pulse laser light source is irradiated to a sample and fluorescence emitted from the sample is observed;
   an incident beam adjuster, which is disposed between the ultra-short pulse laser light source and the microscope main body, and which adjusts a beam diameter and beam divergence of the ultra-short pulse laser beam emitted from the ultra-short pulse laser light source; and
   a controller which causes the incident beam adjuster to be actuated in accordance with a wavelength of the ultra-short pulse laser beam emitted from the ultra-short pulse laser light source.

2. A multiphoton excitation observation apparatus according to claim 1,
   wherein the microscope main body comprises an objective lens which focuses the ultra-short pulse laser beam on the sample; and
   wherein the incident beam adjuster adjusts the beam diameter and the beam divergence of the ultra-short pulse laser beam so as to cause the ultra-short pulse laser beam to be incident with a beam diameter that is substantially equal to a pupil diameter of the objective lens at an entrance of a pupil position of the objective lens.

3. A multiphoton excitation observation apparatus according to claim 1, wherein the controller comprises a memory which stores the wavelength of the ultra-short pulse laser beam and an actuation state of the incident beam adjuster in association with each other, and adjusts the incident beam adjuster in accordance with the actuation state stored in the memory according to the wavelength of the ultra-short pulse laser beam.

4. A multiphoton excitation observation apparatus according to claim 1, further comprising one of an acousto-optic element and an electro-optic element, which is disposed between the ultra-short pulse laser light source and the incident beam adjuster, and which turns ON/OFF the ultra-short pulse laser beam emitted from the pulse laser light source or adjusts an output intensity thereof.

5. A multiphoton excitation observation apparatus according to claim 4, further comprising:
   a beam position/angle correction device, which is disposed between the one of the acousto-optic element and the electro-optic element and the microscope main body, and which changes at least one of a position and an angle of an optical axis of the ultra-short pulse laser beam emitted from the one of the acousto-optic element and the electro-optic element;
   wherein the controller controls the beam position/angle correction device based on the wavelength of the ultra-short pulse laser beam.

* * * * *